United States Patent Office 3,256,247
Patented June 14, 1966

3,256,247
POLYAMINO DERIVATIVES OF LEVULINIC HYDANTOIN AND PROCESS OF MAKING SAME
Domenick D. Gagliardi, East Greenwich, and William J. Jutras, Jr., Peace Dale, R.I., assignors to Argus Chemical Corporation, Brooklyn, N.Y., a corporation of New York
No Drawing. Filed Feb. 7, 1961, Ser. No. 98,999
12 Claims. (Cl. 260—72)

The present invention relates to polyamino derivatives of levulinic hydantoin and to the preparation of the same.

Levulinic hydantoin has the formula

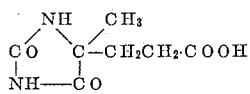

and it has been described in the literature. See H. R. Henze and R. J. Speer, J.A.C.S. 64, 522 (1942), and U.S. Patent No. 2,658,912.

It is known that hydantoins or hydantoin derivatives with organic substituents in the 5 position form carboxylic acids by hydrolysis. The preparation of hydantoic acid from hydantoin is described in Beilstein's "Handbuch der Organischen Chemie," IV, 39.

In a similar manner levulinic hydantoin is split with alkaline agents forming in the first step an acid of the following formula

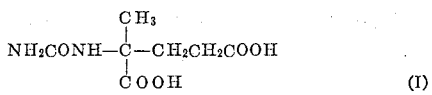

and yielding on further heating, methyl glutamic acid of the following formula

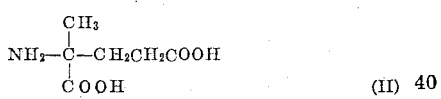

The formation of this acid (II) is described in U.S. Patent No. 2,658,912.

The dicarboxylic acids described under I and II above can be reacted with polyfunctional amino compounds to give new classes of polymers. In carrying out the invention, the hydrolysis of the levulinic hydantoin may be brought about with the polyfunctional amino compound as the alkaline reagent, and subsequent reaction with the dicarboxylic acid results in the formation of the polyamino polymers herein described.

Many groups of polyfunctional amino compounds may be used to prepare the polyamine derivatives according to the invention. We name by way of example: aliphatic polyfunctional amines, such as: ethylene diamine, diethylene triamine, triethylene tetramine, tetraethylene pentamine, monoethanolamine, diethanolamine, triethanolamine, aminoethyl ethanolamine, iminourea, guanylurea, dicyandiamide, hexamethylene diamine; or polyfunctional aromatic amines, e.g. phenylene diamine, p,p'-diaminodiphenylmethane and combinations thereof.

The novel products prepared according to the invention are tacky to solid, brittle resins; some of them are soluble, some dispersible in water, others are soluble in hot glacial acetic acid. They are useful for many purposes, among them as agents for coating and processing textiles, paper and leather, especially as dye-fixing and dye-stripping assistants, epoxy curing agents, molding resins, intermediates for thermo-setting resins, and wet strength resins for paper. They can also be used to form coordination polymeric complexes with salts of metals, such as copper, chromium, nickel, cobalt, silver and other coordinating metals. The aldehyde derivatives of the polyamino polymers of this invention are useful coating resins.

A condensation product with formaldehyde can be made, for instance, by reacting 0.1 to 1 mole of formaldehyde per each mole of nitrogen contained in the polyamino polymer until all the formaldehyde is combined.

In the following, the invention will be more fully described in a number of examples, but it should be understood that these are given by way of illustration and not of limitation and that many changes in the details can be made without departing from the spirit of the invention. In the following examples, LH is the hydantoin of levulinic acid as above described. The reactants are in equimolecular proportions throughout.

EXAMPLE 1

A mixture of 93.0 parts of LH and 51.5 parts of diethylene triamine was heated slowly to 150° C. and held at that temperature for two hours at normal pressure. Cacuum was then applied to the system, and the viscous reaction mixture was heated one hour longer at 150° C. at 100 mm. pressure. Because of the increasing viscosity of the reaction product, the temperature was raised to 160° C. during the next half hour, and raised again to 170° C. for the final half hour of heating at reduced pressure. By this time, the reaction is complete since no further loss of weight can be observed. On cooling, there were obtained 117.0 parts of a brittle amber solid. The reaction product was readily soluble in water and dilute acetic acid.

EXAMPLE 2

58.5 parts of the reaction product from Example 1 were heated with 21.0 parts of dicyandiamide for one hour at 160° C. during which time the viscosity of the molten mixture increased and ammonia was evolved. The condensation product cooled to a dark amber solid, which is soluble in water and dilute acetic acid.

EXAMPLE 3

93.0 parts of LH were mixed with 52.5 parts of diethanolamine and heated slowly to 150° C. Heating was continued for two hours at 150° C. at normal pressure, and two hours longer at 150° C. at 100 mm. pressure. Under vacuum, water distilled readily from the reaction mixture with a weight loss of 13.4 parts. The condensation product was a light brown, tacky solid, soluble in water. To 79.8 parts of the reaction product, 25.4 parts of dicyandiamide were added. The mixture was heated to 150° C. in forty-five minutes and held at that temperature for one hour. The tan-colored melt cooled to a tacky solid which was dispersible in water.

EXAMPLE 4

A mixture of 93.0 parts of LH and 42.0 parts of dicyandiamide was heated slowly to 160° C. During the next two hours of heating, the temperature was gradually increased to 180° C. On cooling, there was obtained 126.5 parts of a water dispersible, brittle tan solid.

EXAMPLE 5

A slurry of 93.0 parts of LH and 72 parts of triethylene tetramine was heated to 150° C. and held at that temperature for two hours at normal pressure. Heating was continued two hours longer at 150° C. at 100 mm. pressure. On cooling to room temperature, the reaction product solidified to a tacky amber solid of 150.1 parts by weight, soluble in water and dilute acetic acid.

EXAMPLE 6

75.0 parts of the reaction product of Example 5 were mixed with 21.0 parts of dicyandiamide and heated slowly to 160° C. obtaining a foamy, dark yellow liquid which evolved ammonia. Heating was continued for two hours during which time the temperature was gradually increased to 180° C. On cooling to room temperature there was obtained a dark brown, brittle, water soluble solid of 86.7 parts by weight.

EXAMPLE 7

93.0 parts of LH were slurried with 94.6 parts of tetraethylene pentamine. The mixture was heated slowly to 150° C. and held at that temperature for two hours as water and ammonia were evolved from the foamy, yellow liquid. Heating was continued two hours longer at 150° C. at 100 mm. pressure. The reaction product cooled to a tacky, golden yellow solid of 170.0 parts by weight, soluble in water and dilute acetic acid.

EXAMPLE 8

21.0 parts of dicyandiamide were mixed with 85.0 parts of the product of Example 7. This mixture was heated slowly to 160° C. and during the next two hours the temperature was raised to 180° C. Ammonia was evolved on heating and the reaction mixture increased in viscosity as heating continued. On cooling there was obtained 100.3 parts by weight of a friable, dark amber solid, which was readily soluble in water and dilute acetic acid.

EXAMPLE 9

A solution of 77.5 parts of 75% hexamethylene diamine in aqueous solution, 93.0 parts of LH, and 100.0 parts of water was refluxed for four hours at 105° to 106° C. The resulting solution was then heated from 24° C. to 200° C. in four hours at 100 mm. pressure. After one more hour at 200° C. and 100 mm. pressure, there were obtained 104.0 parts of a viscous brown liquid which cooled to a tacky solid at room temperature. The resulting resinous product was insoluble in water, but could be dissolved in hot glacial acetic acid.

EXAMPLE 10

9.3 parts of LH and 9.9 parts p,p'-diaminodiphenyl-methane were mixed together in a petri dish. After heating three hours at 160° C. with occasional stirring, the dark brown liquid cooled to a brittle resinous solid. The final product was insoluble in water and dilute acetic acid.

EXAMPLE 11

34.0 parts of the product of Example 7 were dissolved in 48.6 parts of 37% aqueous formaldehyde solution. The mixture was heated at 50° C. for two hours to completely react all of the formaldehyde. On cooling to room temperature, the reacting product was a clear viscous, water soluble liquid.

EXAMPLE 12

40.1 parts of the product of Example 9 were dissolved in 65.0 parts of 37% aqueous formaldehyde. Complete reaction of the formaldehyde was brought about by heating two hours at 50° C. The reaction product cooled to a cloudy, viscous liquid which was soluble in water and dilute acetic acid.

EXAMPLE 13

To evaluate the dye-fixing properties of the products given in the preceding examples, cuttings of rayon challis dyed with 3% Cuprofix Bordeaux BL (C.I. Direct Red 99) were padded with the solutions given in the following table. After drying and curing ten minutes at 300° F. the treated cuttings were subjected to a water bleeding test which was carried out by soaking a treated cutting of the rayon and a piece of white cotton together in 100 ml. of water at 160° F. for one hour. The rayon and cotton cuttings were air dried.

Table I

| Treatment: | Degree of bleeding and staining [1] |
|---|---|
| (1) None | 3 |
| (2) 1% product of Example 1–1% acetic acid | 1 |
| (3) 1% product of Example 2–1% acetic acid | 2 |
| (4) 1% product of Example 5–1% acetic acid | 2 |
| (5) 1% product of Example 5–1% acetic acid–1% $CuCl_2 \cdot 2H_2O$ | 0 |
| (6) 1% product of Example 6–1% acetic acid | 1 |
| (7) 1% product of Example 6–1% acetic acid–1% $CuCl_2 \cdot 2H_2O$ | 2 |
| (8) 1% product of Example 7–1% acetic acid–1% $CuCl_2 \cdot 2H_2O$ | 0 |
| (9) 1% product of Example 8–1% acetic acid | 2 |
| (10) 1% product of Example 8–1% acetic acid–1% $CuCl_2 \cdot 2H_2O$ | 0 |
| (11) 2.5% product of Example 11–1.5% acetic acid | 2 |
| (12) 2.5% product of Example 12–1.5% acetic acid | 1 |

[1] Rating of 3—heavy dye bleeding and staining; 2—medium dye bleeding and staining; 1—slight dye bleeding and staining; 0—no bleeding and no staining.

The lack of or lesser degree of staining and bleeding indicated fixation of the dye. The copper complexes of Examples 5, 6, and 8 were more efficient dye-fixing agents than the polyamino derivatives themselves, as is evidenced by the application, wherein the copper complex was formed in the padding solutions by adding cupric chloride to the acetic acid solution of the polyamino derivatives.

Similar improvements were obtained by adding Cr- or Ni-acetate, instead of copper chloride.

EXAMPLE 14

As further illustration of the dye-fixing properties, the product of Example 8 was applied from finishing formulations normally used to creaseproof rayon as given in the table below. The solutions were padded and dried ten minutes at 300° F. on rayon challis which had been dyed with 3% Cuprofix Bordeaux BL (C.I. Direct Red 99). Cuttings of the treated fabric were washed according to the A.T.C.C. Standard Test Method 35–1957, Test II using 0.5% neutral soap solution but run for one-half hour at 140° F. A piece of plain white cotton was attached to each sample to measure the degree of staining and bleeding.

Table II

| Treatment: | Degree of bleeding and staining [1] |
|---|---|
| (1) None | 3 |
| (2) 30% urea formaldehyde resin–1½% amine hydrochloride catalyst–2% product of Example 8–1% acetic acid | 0 |
| (3) 30% urea formaldehyde resin–1% amine hydrochloride catalyst–1% product of Example 8–1% $Cu(CH_3COO)_2 \cdot H_2O$ | 0 |
| (4) 30% urea formaldehyde resin–1% product of Example 8–1% $CuCl_2 \cdot 2H_2O$ | 0 |

[1] Rating of 3—heavy dye bleeding and staining; 2—medium dye bleeding and staining; 1—slight dye bleeding and staining; 0—no bleeding and no staining.

EXAMPLE 15

The products of Examples 7 and 8 were applied to rayon challis dyed with 3% Metromine RF Brown BRL (C.I. Direct Brown 95). The treatments given in the following table were applied by padding and dried ten minutes at 300° F. Cuttings of the treated samples were then given a wash test as described in Example 14. The degree of staining and bleeding was noted.

Table III

| Treatment: | Degree of bleeding and staining [1] |
|---|---|
| (1) None | 3 |
| (2) 1% product of Example 7–1% acetic acid–1% $Cu(CH_2COO)_2 \cdot H_2O$ | 0 |
| (3) 1% product of Example 8–1% acetic acid | 1 |
| (4) 1% product of Example 8–1% acetic acid–1% $Cu(CH_3COO)_2 \cdot H_2O$ | 0 |

[1] Rating of 3—heavy dye bleeding and staining; 2—medium dye bleeding and staining; 1—slight dye bleeding and staining; 0—no bleeding and no staining.

As may be seen from the above, the results obtained with addition of $Cu(CH_3COO)_2 \cdot H_2O$ were superior.

What we claim is:

1. A process for preparing resinous polyamino polymers from levulinic hydantoin which comprises reacting at temperatures from 150° C. to 200° C. levulinic hydantoin and a polyfunctional polyamino compound selected from the group consisting of ethylene diamine, diethylene triamine, triethylene tetramine, tetraethylene pentamine, monoethanolamine, diethanolamine, triethanolamine, aminoethyl ethanolamine, iminourea, guanylurea, dicyandiamide, hexamethylene diamine, phenylene diamine, and p,p'-diaminodiphenylmethane in equimolar proportion, until the reaction is complete as indicated when no further loss of weight is observed.

2. A process of claim 1, wherein the amine is diethylene triamine.

3. A process of claim 1, wherein the amine is dicyandiamide.

4. A process of claim 1, wherein the amine is triethylene tetramine.

5. A process of claim 1, wherein the amine is hexamethylene diamine.

6. A process of claim 1, wherein the amine is p,p'-diaminodiphenylmethane.

7. A process for preparing resinous polyamino polymers from levulinic hydantoin which comprises reacting in a first stage at temperatures of about 150–170° C. levulinic hydantoin with a polyfunctional amine as defined in claim 1 in equimolecular proportion and reacting the reaction product in a second state at temperatures from 150° C. to 180° C. with dicyandiamide in equimolecular proportion.

8. The process as claimed in claim 7, wherein the amine used in the first stage is diethylene triamine.

9. The process as claimed in claim 7, wherein the amine used in the first stage is triethylene tetramine.

10. The process as claimed in claim 7, wherein the amine used in the first stage is tetraethylene pentamine.

11. The product obtained by the process of claim 1.

12. A condensation product of formaldehyde with a resinous polyamino polymer from levulinic hydantoin obtained by the process of claim 1, which contains 0.1–1.0 mole of formaldehyde per each mole of nitrogen contained in said polyamino polymer of levulinic hydantoin.

References Cited by the Examiner

UNITED STATES PATENTS

| | | | |
|---|---|---|---|
| 2,169,546 | 8/1939 | Widmer | 8—29 |
| 2,658,912 | 11/1953 | Pfister et al. | 260—309.5 |
| 2,870,201 | 1/1959 | Pollack | 260—78 |
| 2,892,817 | 6/1959 | Ham | 260—78 |
| 2,917,490 | 12/1959 | Caldwell et al. | 260—78 |
| 2,956,853 | 10/1960 | Dach | 8—29 |
| 2,985,541 | 5/1961 | Gagliardi | 260—309.5 |

OTHER REFERENCES

F. Vickerstaff: "The Physical Chemistry of Dyeing," Interscience Publisher Inc., New York, N.Y., 1954.

WILLIAM H. SHORT, *Primary Examiner.*

MORRIS O. WOLK, JOSEPH L. SCHOFER,
*Examiners.*